United States Patent
Pellen

(10) Patent No.: US 8,330,411 B2
(45) Date of Patent: Dec. 11, 2012

(54) ELECTRIC VEHICLE BATTERY CHARGING BY DRIVING THE PROPULSION SHAFT

(75) Inventor: Alain T. Pellen, Boca Raton, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1276 days.

(21) Appl. No.: 12/102,782

(22) Filed: Apr. 14, 2008

(65) Prior Publication Data

US 2009/0256522 A1   Oct. 15, 2009

(51) Int. Cl.
*H02J 7/14* (2006.01)
(52) U.S. Cl. ........ 320/104; 320/109; 903/903; 903/904; 903/906; 180/65.285

(58) Field of Classification Search .......... 320/104, 320/109; 903/903, 904, 906, 907; 180/65.1–65.31, 180/65.285
See application file for complete search history.

(56) References Cited

U.S. PATENT DOCUMENTS 5,301,096 A * 4/1994 Klontz et al. .................. 363/37
2008/0297109 A1 * 12/2008 Sandberg et al. ............. 320/109

* cited by examiner

*Primary Examiner* — Huy Q Phan
*Assistant Examiner* — Temilade S Rhodes-Vivour
(74) *Attorney, Agent, or Firm* — Kaplan Breyer Scharz & Ottesen, LLP

(57) ABSTRACT

A system and method for charging a battery of an electric vehicle is disclosed. An embodiment of the present invention enables an internal motor of an electric vehicle to be back-driven. When the internal motor is backdriven, it operates as an electric generator to produce electric power used to charge the electric vehicle's battery.

12 Claims, 3 Drawing Sheets

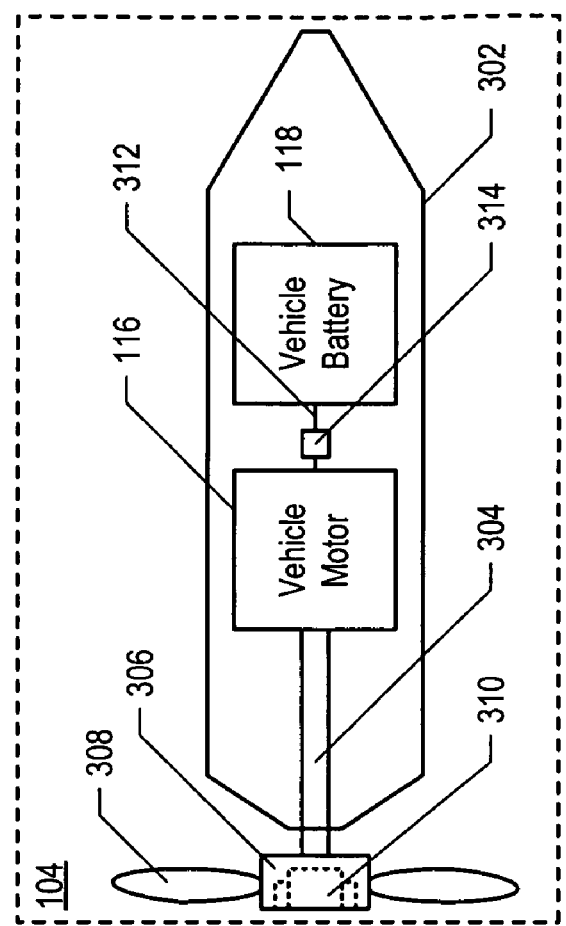
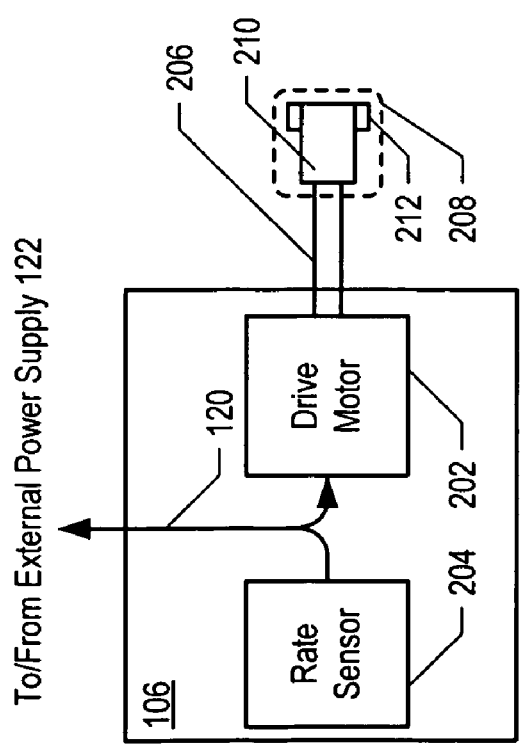
FIG. 3
FIG. 2

ELECTRIC VEHICLE BATTERY CHARGING BY DRIVING THE PROPULSION SHAFT

FIELD OF THE INVENTION

The present invention relates to electric vehicles in general, and, more particularly, to electric vehicle battery charging.

BACKGROUND OF THE INVENTION

Battery operated electric vehicles are used in terrestrial, airborne, and marine surface and undersea applications. Typically, it is necessary to occasionally recharge a vehicle's batteries to enable continued operation. This is often done by connecting an electrical power supply to the electric vehicle via an electrical cable. In many environments, however, the need to make such an electrical connection can lead to several problems.

First, some electric vehicles operate in areas that are not easily accessed with an electric power cable. In some cases, the area may be quite remote, which would necessitate the use of a very long cable. Typically, a battery is charged with D.C. current. As a result, very long electric power cables can result in a large voltage drop, which makes the charging process energy inefficient and more time-consuming.

Second, some environments are not amenable to making and breaking an electrical connection. For example, some environments may have an atmosphere that is easily combustible or, alternatively, be underwater. Also, battery charging may be prohibited onboard some ships due to safety concerns. Further water intrusion in connectors and corrosion underwater can impact the reliability of such an electrical connection.

Third, it may be necessary to retrieve an underwater vehicle and allow it to dry before providing it an electrical connection to an external power supply. This can further reduce the efficiency of the recharging operation and reduce the overall operability of the electric vehicle.

SUMMARY OF THE INVENTION

The present invention enables the charging of an electric vehicle without some of the costs and disadvantages for doing so in the prior art. For example, embodiments of the present invention are particularly well-suited for charging underwater electric vehicles without removing the vehicles from their underwater environments.

The present invention charges the battery (or batteries) of an electric vehicle by backdriving the vehicle propulsion electric motor to produce electric power. This electric power is conveyed to the battery to charge it. The present invention is suitable for use with any electric vehicle whose internal motor can be backdriven by rotating or otherwise actuating the vehicle's drive shaft. For example, an embodiment of the present invention charges an electric vehicle's battery by backdriving its motor through a propeller driveshaft. Alternative embodiments of the present invention are suitable for coupling to a wheel of a terrestrial vehicle to turn the terrestrial vehicle's driveshaft.

Some embodiments of the present invention comprise a removable coupling that can be used to mechanically couple an independent (external) motor to the internal motor through the vehicle's driveshaft. In some embodiments, the coupling comprises two connector parts: a first part that is mounted on the drive shaft of the external motor and a second part that is mounted on the drive shaft of the electric vehicle. These two connector parts can be positively engaged so that a rotation of the drive shaft of the external motor results in a rotation of the internal motor. When the internal motor is rotated to backdrive it, the motor operates as an electric generator.

An embodiment of the present invention comprises an apparatus for charging a battery of an electric vehicle while the electric vehicle is substantially at rest, wherein the apparatus comprises: a first motor, wherein the first motor is independent of the electric vehicle; and a coupling for demountably engaging the first motor and the electric vehicle, wherein the electric vehicle comprises the battery and a second motor, and wherein the coupling enables the first motor to backdrive the second motor; wherein the second motor provides electric power to the battery when the second motor is backdriven.

BRIEF DESCRIPTION OF THE DRAWINGS

FIG. 2 depicts a more detailed schematic diagram of details of motor 106 in accordance with an illustrative embodiment of the present invention.

FIG. 3 depicts a more detailed schematic diagram of details of electric vehicle 104 in accordance with the illustrative embodiment of the present invention.

DETAILED DESCRIPTION

The following terms are defined for use in this Specification, including the appended claims:

Electrically connected means that two objects are in direct electrical contact without any intervening elements. In other words, the region of contact between the two objects remains at a substantially uniform voltage for substantially any current (neglecting any voltage drop due to the resistivity of the physical connection medium, such as a wire).

Electrically coupled means that two objects are in electrical contact. This can be via direct physical contact (e.g., a plug in an electrical outlet, etc.), via an electrically-conductive intermediate (e.g., a wire that connects devices, etc.), or via intermediate devices, etc. (e.g., a resistor electrically connected between two other electrical devices, etc.).

Mechanically coupled means that one device is linked to another device such that movement of the one device affects the other device. For example, a motor and a mirror are mechanically-coupled if actuation of the motor causes motion of the mirror. This could be through direct contact, as in the case of two physically-coupled devices (e.g., a mirror that is mounted on a linear-motor); or through an intermediate medium (e.g., a mirror that is moved via a hydraulic force that is generated by a motor).

Operatively coupled means that the operation of one device affects another device.

Physically coupled means in direct, physical contact (e.g., a mirror that is mounted on a linear-motor).

Figure 1:
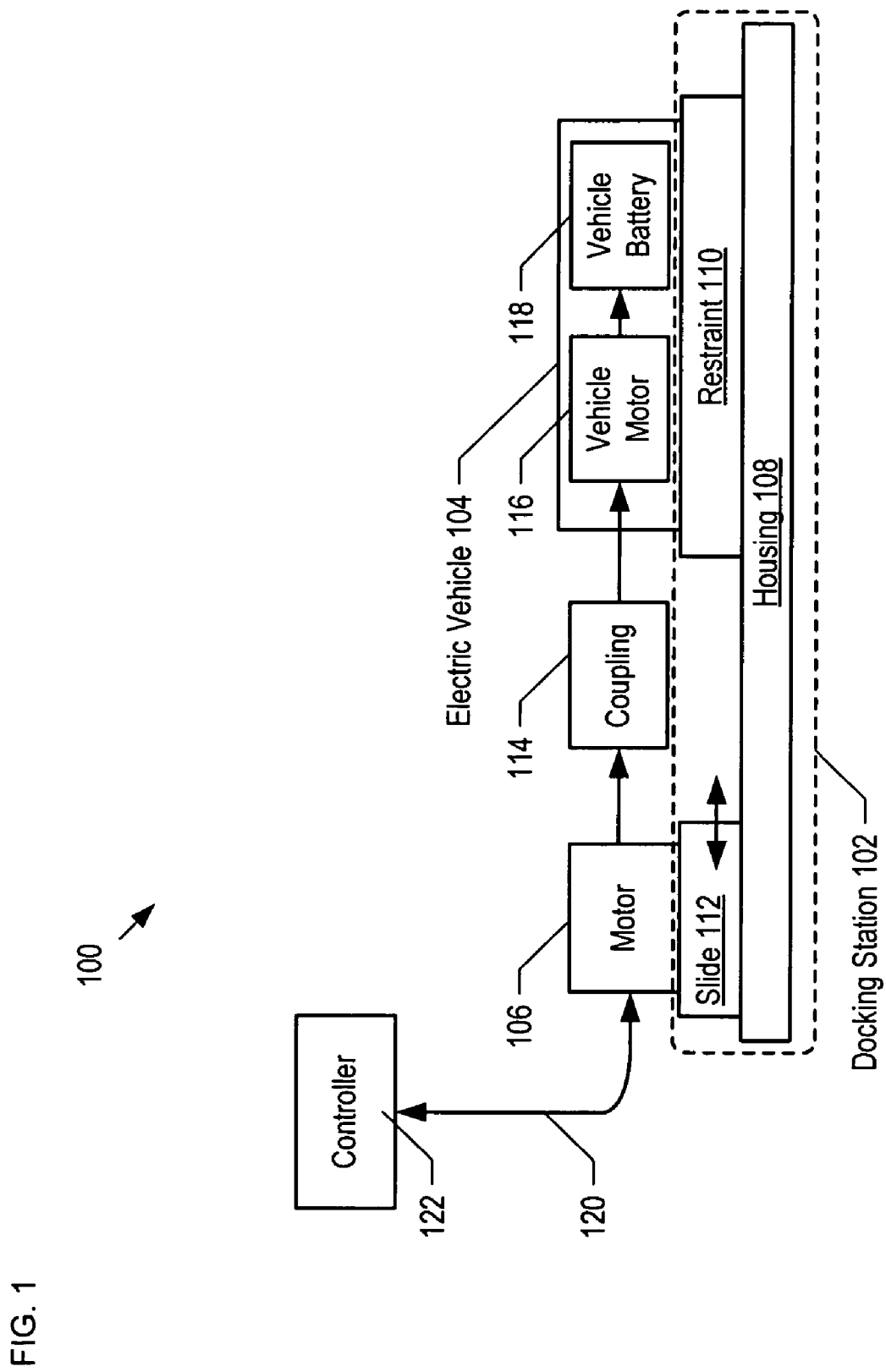
FIG. 1 depicts a schematic diagram of details of an electric vehicle charging system in accordance with an illustrative embodiment of the present invention.

FIG. 1 depicts a schematic diagram of details of an electric vehicle charging system in accordance with an illustrative embodiment of the present invention. Charging system 100 comprises docking station 102, motor 106, and coupling 114.

Docking station 102 is an apparatus for receiving and locating electric vehicle 104 and for enabling motor 106 to physically couple to the electric vehicle 104. Docking system 102 comprises housing 108, restraint 110, and slide 112. In some embodiments, docking station 102 is adapted for use in a harsh environment, such as deep-sea, high temperature, high pressure, low temperature, low pressure applications, and/or the like.

Housing 108 is a substantially rigid frame for holding and providing suitable stability to restraint 110 motor 106, and electric vehicle 104.

Restraint 110 is a conventional restraint for locating and securely holding electric vehicle 104. The specific design for restraint 110 is dependent upon the electric vehicle for which docking station 102 is used. It will be clear to one of ordinary skill in the art how to make and use restraint 110.

Slide 112 is a platform to which motor 106 is mounted. Slide 112 is coupled to housing 108 such that it can move along housing 108 to engage or disengage coupling 114.

Motor 106 is a motor for backdriving vehicle motor 116 via coupling 114. For the purposes of this specification, including the appended claims, the term "back-driving" means mechanically actuating a motor to cause the motor to operate as an electric generator and generate electric power. Motor 106 is external to, and independent of, electric vehicle 104 (when motor 106 and electric vehicle 104 are decoupled). The rate at which charging system 100 charges vehicle battery 118 is determined by the speed of motor 106. The speed of motor 106 is controlled by controller 122 in conventional manner. Controller 122 drives motor 106 with an A.C. drive signal, which does not exhibit significant voltage drop—even over long cable lengths. Motor 106 is described in more detail below and with reference to FIG. 2. In some embodiments, motor 106 is a self-contained, battery-operated motor and cable 120 and controller 122 are not required. In some embodiments, motor 106 is a pneumatic motor that is driven by air flow, which is provided through a hose. In some embodiments, motor 106 is a hydraulic motor that is driven by a flow of substantially incompressible fluid, such as hydraulic fluid, which is provided through a hose.

Electric vehicle 104 is a submersible vehicle driven by means of an electric motor, which is internal to the electric vehicle. Electric vehicle 104 is propelled through the water by means of the rotation of propeller blades that are mounted on the end of a drive shaft attached to the internal motor. Electric vehicle is described in more detail below and with reference to FIG. 3.

Coupling 114 is a two-part mechanical connector, wherein the two parts are demountably attachable. One part is physically coupled with motor 106 and the other part is physically coupled with electric vehicle 104. When the two parts of coupling 114 are engaged, motor 106 and electric vehicle 104 are mechanically coupled. When coupling 114 is disengaged, motor 106 and electric vehicle 104 are not mechanically coupled. Coupling 114 is described below and with reference to FIGS. 2, 3, and 4.

FIG. 2 depicts a more detailed schematic diagram of details of motor 106 in accordance with an illustrative embodiment of the present invention. Motor 106 comprises drive motor 202, rate sensor 204, drive shaft 206, and connector 208.

Motor 106 is an externally driven motor for backdriving vehicle motor 116 through coupling 114. Motor 106 is a submersible rotary motor that is suitable for use in deep-sea applications. Although in the illustrative embodiment, motor 106 is an electric motor, it will be clear to those of ordinary skill in the art, after reading this specification, how to make and use alternative embodiments of the present invention wherein motor 106 is other than an electric motor. Motors suitable for use in motor 106 include, without limitation:

i. single-phase electric motors; or
ii. multi-phase electric motors; or
iii. pneumatic motors; or
iv. rotary motors; or
v. linear motors; or
vi. hydraulic motors; or
vii. battery-driven electric motors; or
viii. any combination of i, ii, iii, iv, v, vi, and vii.

Connector 208 comprises hub 210 and engagement keys 212. Hub 210 is physically coupled with drive shaft 206.

When energized, motor 106 rotates drive shaft 206 and, therefore, connector 208. Engagement keys 210 provide positive engagement with connector 310 to collectively form engaged two-part coupling 114.

The speed of motor 106 is monitored by rate sensor 204. Cable 120 conveys information from rate sensor 204 to controller 122, which enables controller 122 to control the speed of motor 106 and, thereby, the charge voltage for charging vehicle battery 118.

In the illustrative embodiment, motor 106 is mounted to docking station 102. In some alternative embodiments, motor 106 is a portable motor that is manually coupled to electric vehicle 104. In some embodiments, docking station 102 is not present. In some embodiments, electric vehicle 104 is restrained from motion during charging by a conventional restraint.

FIG. 3 depicts a more detailed schematic diagram of details of electric vehicle 104 in accordance with the illustrative embodiment of the present invention. Electric vehicle 104 comprises vehicle motor 116 and vehicle battery 118, which are enclosed by hull 302.

Vehicle motor 116 is physically coupled to drive shaft 304, which rotates hub 306 and propeller blades 308 to propel electric vehicle 104 through the water. Hub 306 comprises connector 310, which receives and mates with connector 208 (depicted in FIG. 2) to engage motor 106 and electric vehicle 104. Connectors 208 and 310 collectively define coupling 114.

Although in the illustrative embodiment, charging system 100 is suitable for charging an electric vehicle that is a deep-sea submersible vehicle, it will be clear to one skilled in the art, after reading this specification, how to make and use alternative embodiments of the present invention wherein charging system 100 is suitable for charging any type of electric vehicle, such as wheeled land vehicles, aircraft, surface marine craft, and the like. It will also be clear, after reading this specification, how make and use alternative embodiments wherein a vehicle that is propelled by wheels or tracks is charged by a drive element such as a belt, wheel, cog, sprocket, drum, etc., which is mechanically coupled to motor 106 so that motor 106 can rotate the vehicle's wheels to backdrive the vehicle's internal motor.

Figure 4:
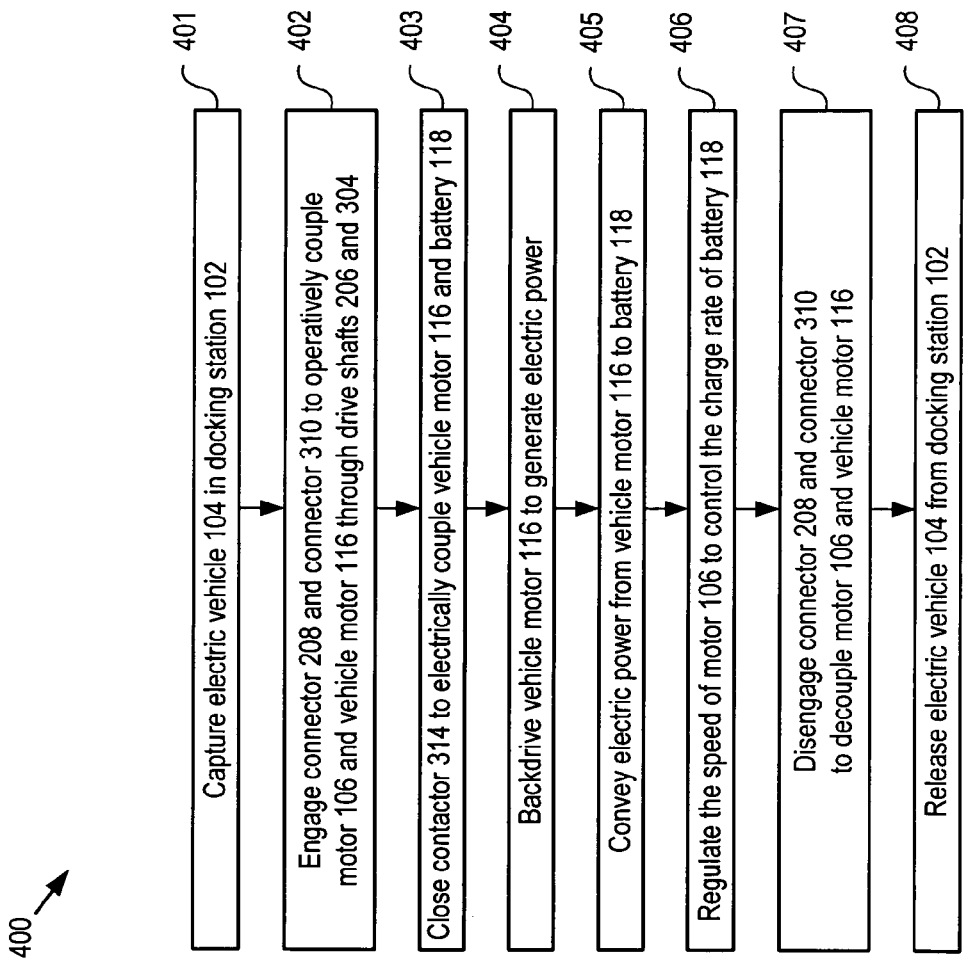
FIG. 4 depicts a method for charging the battery of an electric vehicle in accordance with the illustrative embodiment of the present invention.

FIG. 4 depicts a method for charging the battery of an electric vehicle in accordance with the illustrative embodiment of the present invention. Method 400 is described herein with continuing reference to FIGS. 1, 2, and 3.

Method 400 comprises operations suitable for charging electric vehicle 104, and begins with operation 401, wherein electric vehicle 104 is captured in docking station 102.

At operation 402, slide 112 travels toward electric vehicle 104 and engages connector 208 and connector 310. As a result, motor 106 is coupled to electric vehicle 104 through coupling 114. In some embodiments, coupling 114 comprises only a single fitting that is only mounted on drive shaft 206, wherein the fitting engages the electric vehicle through friction or by engaging with pre-existing structure included with the electric vehicle. In other words, in some embodiments, electric vehicle 104 does not include a specific adaptation for engaging with motor 106.

At optional operation 403, contactor 314 is closed to electrically couple vehicle motor 116 and battery 118.

At operation 404, motor 106 is driven in a direction suitable for backdriving vehicle motor 116. As a result, vehicle motor 116 operates as an electric generator and generates electric power. During operation 402, restraint 110 restrains electric vehicle 104 so that it does not move while propeller blades 308 rotate.

At operation 405, electric power is conveyed from vehicle motor 116 to vehicle battery 118 via cable 312. Operations 402 and 403 are maintained for a time sufficient to charge vehicle battery 118 to a desired charge level.

At optional operation 406, controller 122 regulates the speed of motor 106 to control the rate at which battery 118 is charged by vehicle battery 116. Controller 122 controls the speed of motor 106 using information provided by rate sensor 204.

At operation 407, slide 112 travels away from electric vehicle 104 to disengage connectors 208 and 310.

At operation 408, restraint 110 releases electric vehicle 104.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus for charging a battery of an underwater electric vehicle while the electric vehicle is substantially at rest underwater, wherein the apparatus comprises:
    a first motor, wherein the first motor is independent of the underwater electric vehicle;
    a coupling for demountably mechanically coupling the first motor and the underwater electric vehicle, wherein the underwater electric vehicle comprises the battery and a second motor, and wherein the coupling enables the first motor to backdrive the second motor; and
    an underwater docking station, wherein the docking station comprises:
    a restraint, wherein the restraint receives the underwater electric vehicle and restrains the underwater electric vehicle from moving; and
    a slide, wherein the first motor is disposed on the slide and wherein the slide is movable towards and away from the restraint to enable the coupling to demountably couple or uncouple the first motor to the underwater electric vehicle.

2. The apparatus of claim 1 further comprising a controller that controls the speed of the first motor.

3. The apparatus of claim 2 further comprising:
    a rate sensor that monitors the speed of the first motor; and
    an electrical cable that conveys information from the rate sensor to the controller.

4. The apparatus of claim 2 wherein the controller delivers AC electrical power to the first motor.

5. The apparatus of claim 1 wherein the first motor is a submersible motor and is disposed underwater.

6. The apparatus of claim 1 wherein the coupling comprises:
    a first connector that is mechanically coupled to the first motor; and
    a second connector that is mechanically coupled to a propeller hub of the underwater electric vehicle, wherein the first connector and the second connector are configured to demountable engage one another.

7. A method for charging a battery of an underwater electric vehicle while the electric vehicle is substantially at rest underwater, wherein the electric vehicle comprises the battery and a first motor, and wherein the method comprises:
    capturing and restraining an underwater electric vehicle at an underwater docking station;
    mechanically coupling a submersible motor, which is disposed on a slide that is movably coupled to the docking station, to the first motor within the electric vehicle;
    backdriving the first motor with the submersible motor to generate electric power; and
    conveying the electric power to the battery.

8. The method of claim 7 wherein the operation of mechanically coupling further comprises mechanically coupling the submersible motor to a propeller hub of the underwater electric vehicle.

9. The method of claim 7 wherein the operation of backdriving further comprises delivering AC electrical power to the submersible motor.

10. The method of claim 7 further comprising mechanically decoupling the submersible motor from the first motor in the underwater electric vehicle.

11. The method of claim 10 further comprising releasing the underwater electric vehicle.

12. A method for charging a battery of an underwater electric vehicle while the electric vehicle is substantially at rest underwater, wherein the electric vehicle comprises the battery and a first motor, and wherein the method comprises:
    docking the underwater electric vehicle at an underwater docking station;
    supplying alternating current electric power to the underwater docking station;
    driving a submersible motor with the alternating current electric power;
    backdriving the first motor in the underwater electric vehicle by mechanically coupling the submersible motor to a propeller hub of the underwater electric vehicle, wherein the mechanical coupling is effected by sliding the submersible motor along the underwater docking station toward the underwater electrical vehicle; and
    delivering to the battery electric power generated by backdriving the first motor.

* * * * *